United States Patent
Edelstein et al.

(10) Patent No.: US 6,378,128 B1
(45) Date of Patent: *Apr. 23, 2002

(54) SYSTEM AND METHOD FOR DYNAMICALLY MODIFYING AN INSTALL-SET

(75) Inventors: Noah B. Edelstein, Seattle; Heikki J. Kanerva, Redmond, both of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,924

(22) Filed: Oct. 8, 1998

(51) Int. Cl.⁷ .............................................. G06F 9/445
(52) U.S. Cl. ...................................... 717/174; 709/221
(58) Field of Search ...................... 717/11, 174, 175; 707/10, 104, 203; 709/221–224; 711/133, 136; 713/1

(56) References Cited

U.S. PATENT DOCUMENTS

| | | | | |
|---|---|---|---|---|
| 5,564,037 A | * | 10/1996 | Lam ............................ | 711/161 |
| 5,581,757 A | * | 12/1996 | Maxey | |
| 5,586,304 A | * | 12/1996 | Stupek, Jr. et al. ........... | 717/11 |
| 5,617,566 A | * | 4/1997 | Malcolm ..................... | 707/204 |
| 5,832,274 A | * | 11/1998 | Cutler et al. .................. | 717/11 |
| 5,933,647 A | * | 8/1999 | Aronberg et al. ............. | 717/11 |
| 5,974,454 A | * | 10/1999 | Apfel et al. ................. | 709/221 |
| 6,041,333 A | * | 3/2000 | Bretschneider et al. ..... | 707/203 |
| 6,075,943 A | * | 6/2000 | Feinman ....................... | 717/11 |
| 6,094,679 A | * | 7/2000 | Teng et al. .................. | 709/220 |
| 6,138,153 A | * | 10/2000 | Collins, III et al. ........ | 709/221 |
| 6,192,518 B1 | * | 2/2001 | Neal ............................ | 717/11 |
| 6,327,705 B1 | * | 12/2001 | Larsson et al. ............... | 717/11 |

OTHER PUBLICATIONS

IBM Technical Disclosure Bulletin, "Software Custom Installation for Nodes in a Network," vol. 34, Issue No. 10A, Mar. 1, 1992, pp. 13–17.*

Carl Staelin, "Mkpkg: A Software Package Tool," Hewlett Packard HPL–97–125 (R.1), Jan. 14, 1997, pp. 1–13.*

Mike Kelly, "Gain Control of Application Setup and Maintenance with the New Windows Installer," Microsoft systems Jounal Sep., 1998, pp. 15–18 & 20–24.*

* cited by examiner

Primary Examiner—Tuan Q. Dam
(74) Attorney, Agent, or Firm—Merchant & Gould

(57) ABSTRACT

Dynamically creating or modifying an install-set of a program module comprising required components and optional components. Usage and configuration parameters are detected in the operating environment of the target computer system. Usage parameters relate to past usage of prior versions of the components of the program module. Configuration parameters may be any configuration aspect of the operating environment, including hardware and software configuration. Based on detected usage and/or configuration parameters, determinations may be made as to whether each of the components of the program module are to be included in, or excluded from, an install-set. The install-set is the set of required and/or optional components that are selected for installation onto the target computer system. Based on the determinations, the install preferences of each component are set. Install preferences are properties that signal whether each component is to be installed by an installer module. The installer module installs, or does not install, the components according to their install preference.

32 Claims, 4 Drawing Sheets

SYSTEM AND METHOD FOR DYNAMICALLY MODIFYING AN INSTALL-SET

Technical Field

The present invention relates generally to the installation of program modules on a computer system. More particularly, the present invention relates to dynamic creation or modification of an install-set, prior to installation of program modules on a computer system.

BACKGROUND OF THE INVENTION

Modern application program modules are often made up of many components. Certain components provide the basic functionality of the application program module, while other components provide extended functionality. As an example, a word processing program module may have certain basic functionality components, which allow a user to input and edit text. The word processing program module may also include extended functionality components that provide additional features, such as spell-checking, grammar checking, graphics editors, etc.

A common industry practice is to deliver to the user an application program module having a set of required components and a set of optional components. As such, a selected set of required and/or optional components, called an install-set, may be designated for installation onto a target computer system. Only those components included in the install-set are installed onto the target computer system. The install set desired by each user may be different. Choice of an install set may be driven by user or system requirements, system imitations, resource usage patterns, etc.

Another common industry practice is to automate, at least partially, the process involved in installing an install-set of a program module onto a target computer system. Generally, an installation program module is provided that is operable to copy an install-set into the appropriate memory locations of the target computer system. The installation program module may perform a "full" installation, automatically installing all required and all optional components of an application program module onto the target computer system. A "full" installation requires little user interaction. However, a "full" install-set includes many unnecessary and/or undesired components, which may be referred to collectively as "bloat." Installing "bloat" onto a target computer system undesirably leads to the inefficient use of system resources.

In order to reduce "bloat," an installation program module may present the user with the option to perform a "custom" installation. During a "custom" installation, the user selects the components of the application program module to be included in the "custom" install-set. Generally, a "custom" installation will involve the installation program automatically installing all required components, but prompting the user for input prior to installing any optional components. While a "custom" installation is effective to reduce "bloat," excessive user interaction may cause such an installation process to be undesirable.

In order to reduce both "bloat" and user interaction in the installation process, the installation program module may provide the user with the option to perform a "typical" installation. During a "typical" installation, the installation program module automatically installs a "typical" install-set onto the target computer system. The "typical" install-set is a pre-defined set of required and/or optional components. The components of a "typical" install-set are generally selected based on a software manufacturer's best estimation as to the requirements of the average user of an average computer system. While in some cases a "typical" install-set is effective to reduce "bloat," in other cases it may serve to exclude some components that are in fact desired or required by a user. Therefore, a "typical" installation is often undesirable because the "typical" install-set is constant for all users and cannot be modified, without user interaction, to suit the requirements of an individual user or computer system.

Accordingly, there remains a need in the art for dynamic creation or modification of an install-set, without user interaction, to accommodate the needs of an individual user and/or the requirements of an individual computer system.

SUMMARY OF THE INVENTION

The present invention fulfills the need in the art for dynamically creating or modifying an install-set of a program module. The install-set may be dynamically created or modified, without user interaction, based on usage parameters of prior versions of the program module and/or the configuration parameters of the operating environment of the target computer system. Such dynamic modification of an install-set provides a simple installation process that accommodates the needs of an individual user and/or the requirements of an individual computer system.

A program module typically comprises a plurality of components. Some of the components may be required for operation of the program module, while other components may be optional. Thus, not all components of a program module must be installed onto a target computer system. An install-set is the set of components that are designated for installation onto the target computer system.

An install-set may be created or modified in response to detecting a parameter in the target operating environment of the target computer system. Based on the parameter, a determination may be made as to whether a component of the program module is to be installed onto the target computer system. After determining that the component is to be installed, the component may be designated for inclusion in, or exclusion from, the install-set. When the install-set is complete, all components therein are installed onto the target computer system.

The parameter detected in the target operating environment may relate to prior usage of a prior version of the program module. In such a case, the target operating environment is scanned for a prior version of the component and, if located, the date on which it was installed is determined. If the current date is not more than a period of time, for example one week, after the install date, the new version of the component is included in the install-set. Also, the date on which the prior version of the component was last accessed can be determined. If the last access date is more than a period of time, for example one week, after the install date, the new version of the component is included in the install-set. If the current date is more than a period of time, for example one week, after the install date and the last access date is less than the period of time after the install date, the component is typically excluded from the install-set.

The parameter detected in the target operating environment may also relate to the configuration of the target operating environment. Depending on the configuration of the target operating environment, a determination may be made as to whether a component should be included in, or excluded from, the install-set. For example, the target operating environment may be scanned to detect the available free space in the hard disk drive of the target computer system. If the available free space is minimal, a nonessential component may be excluded from the install-set. Also, the target operating environment may be scanned for the existence of a peripheral device. If a particular peripheral device is detected, a certain component of the program module may be required to drive the device. Further, the target operating environment may be scanned for the existence of a network connection. If a network connection is detected, some components of the program module may be excluded from the install-set because they may be easily retrieved from the network if subsequently needed.

A determination as to whether a component is to be included in the install-set may be made using any commonly known type of logic operation, for example traversing a decision tree. After a determination has been made, an installation preference is designated for the component. The installation preference may be simply "Install," or "DoNotlnstall." The installation preference may also specify different types of installation, such as installation of the component onto the local memory of the target computer system ("PreferLocal"), installation of the component such that it is run from the source medium ("PreferSource") and installation of the component such that it is an advertised feature, i.e., presented to the user as if functional, but not fully installed until the user first accesses the feature ("PreferAdvertise"). Subsequently, each component is installed, or not installed, according to its install preference.

DETAILED DESCRIPTION OF THE EXEMPLARY EMBODIMENTS

Figure 1:
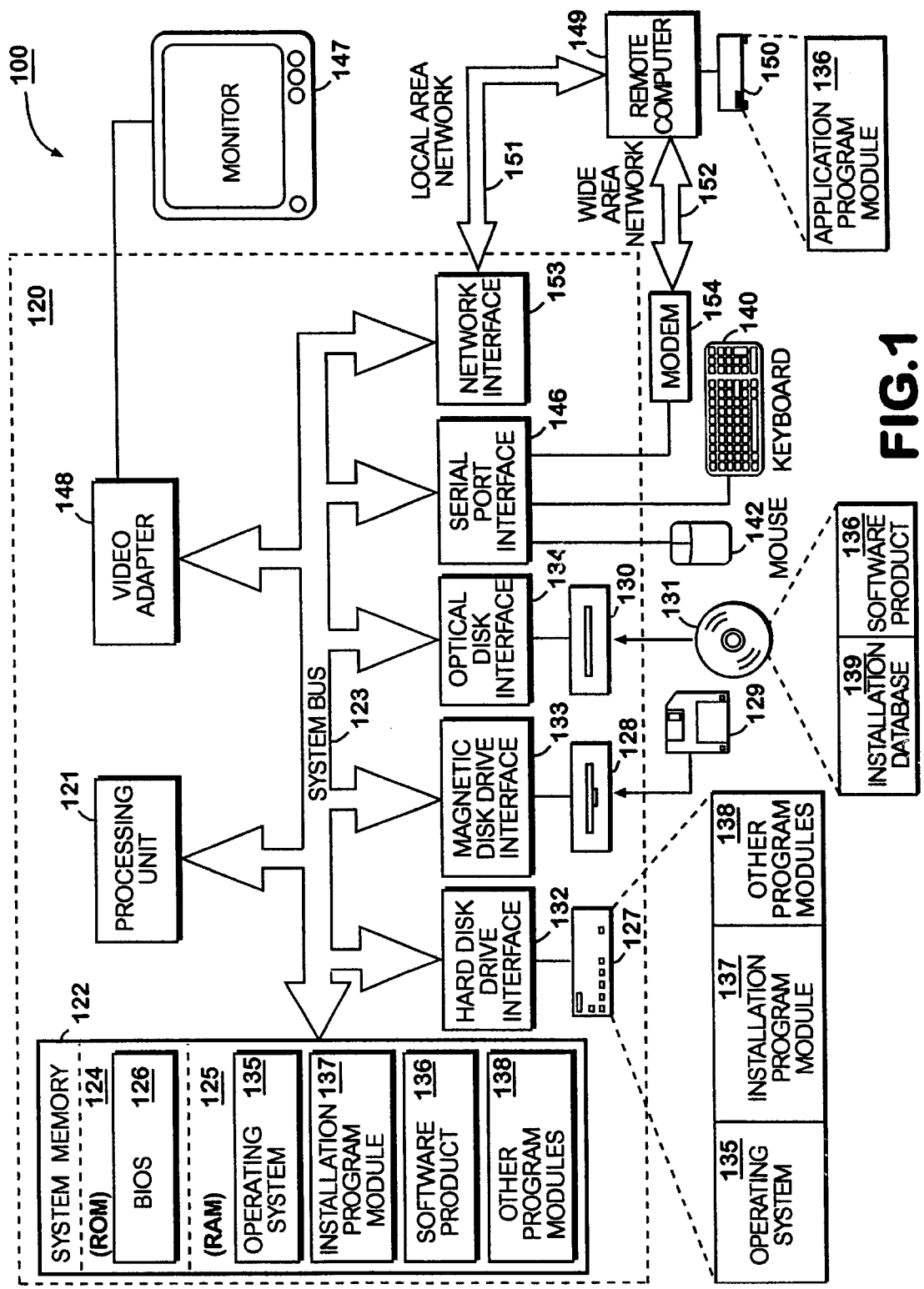
FIG. 1 is a functional block diagram of a computer system in an exemplary operating environment for the exemplary embodiments of the invention.

The present invention provides dynamic creation or modification of an install-set of a program module. For example, a typical application program module may comprise a set of components. Some components of the application program module are required components, while others are optional components. Therefore, when an application program module is installed onto a target computer system, not all modules must be installed. An installset is the set of components that are selected to be installed onto the target computer system.

The present invention dynamically creates or modifies an install-set of a program module in response to the detection of certain parameters in the target operating environment of the target computer system. As will be discussed below, the parameters may comprise any useful information derived from any aspect of the target operating environment. Parameters serve as indicators as to how the target operating environment is configured and how previously installed program modules have been utilized. Accordingly, determinations can be made from the presence of various parameters, or the lack thereof, as to which components of the application program module should be installed onto the target computer system to provide optimal performance.

The description of the exemplary embodiment of the present invention will hereinafter refer to the drawing, in which like numerals indicate like elements throughout the several figures. Beginning with FIG. 1, an exemplary operating environment 100 of a computer system 120 is shown. The exemplary operating environment 100 is typical of a target operating environment in which the present invention might operate to detect parameters so as to determine an install-set for an application program module. However, those skilled in the art should appreciate that the invention may be practiced in any type of computer operating environment. Therefore, the scope of the present invention is not intended to be limited to the detection of parameters in the exemplary operating environment 100.

The exemplary embodiment of the present invention will be described in the general context of an installation program module 137 for dynamically modifying an install-set of an application program module, in response to the detection of parameters in an exemplary target operating environment. Those skilled in the art will recognize that the invention may be implemented in combination with various other program modules 138. Generally, program modules include routines, programs, components, data structures, etc. that perform particular tasks or implement particular abstract data types. Moreover, those skilled in the art will appreciate that the invention may be practiced with computer system configurations other than the one shown, such as: hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary operating environment 100 for implementing the invention includes a conventional personal computer system 120, including a processing unit 121, a system memory 122, and a system bus 123 that couples the system memory 122 to the processing unit 121. The system memory 122 includes read only memory (ROM) 124 and random access memory (RAM) 125. A basic input/output system 126 (BIOS), containing the basic routines that help to transfer information between elements within the personal computer system 120, such as during start-up, is stored in ROM 124.

The personal computer system 120 further includes a hard disk drive 127, a magnetic disk drive 128, e.g., to read from or write to a removable disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage for the personal computer system 120. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

A number of program modules may be stored in the drives and RAM 125, including an operating system 135, one or more application program modules 136, an installation program module 137, and other program modules 138. In particular, the installation program module 137 may comprise computer-implemented instructions for carrying out an exemplary method of the present invention. An exemplary embodiment of the installation program module 137 will be described in detail with reference to FIG. 2.

Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a game port or a universal serial bus (USB). A monitor 147 or other type of display device is also connected to the system bus 123 via an interface, such as a video adapter 148. In addition to the monitor, personal computer systems typically include other peripheral output devices (not shown), such as speakers or printers.

The personal computer system 120 may operate in a networked environment using logical connections to one or more remote computer systems, such as a remote computer system 149. The remote computer system 149 may be a server, a router, a peer device or other common network node, and typically includes many or all of the elements described relative to the personal computer system 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer system 120 is connected to the LAN 151 through a network interface 153. When used in a WAN networking environment, the personal computer system 120 typically includes a modem 154 or other means for establishing communications over the WAN 152, such as the Internet. The modem 154, which may be internal or external, is connected to the system bus 123 via the serial port interface 146. In a networked environment, program modules depicted relative to the personal computer system 120, or portions thereof, may be stored in the remote memory storage device. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 153.

Notwithstanding the broad applicability of the principles of the present invention, it should be understood that the configuration of the exemplary embodiment as an installation program module 137 for widely-used personal computer systems 120 provides significant advantages. In particular, the installation program module 137, comprising computer-implemented instructions for performing the method of the present invention, described in this specification, is specifically designed to exhibit acceptable memory-use and performance characteristics when implemented on the conventional personal computer system 120. In so configuring the installation program module 137, certain trade-off balances, particularly between the often conflicting goals of minimizing memory storage and increasing performance speed, have necessarily been struck. It should be understood that variations of the trade-off balances struck in the exemplary embodiments described in this specification are within the spirit and scope of the present invention, particularly in view of the fact that inevitable improvements in computer hardware and memory storage devices will make other trade-off balances feasible.

Figure 2:
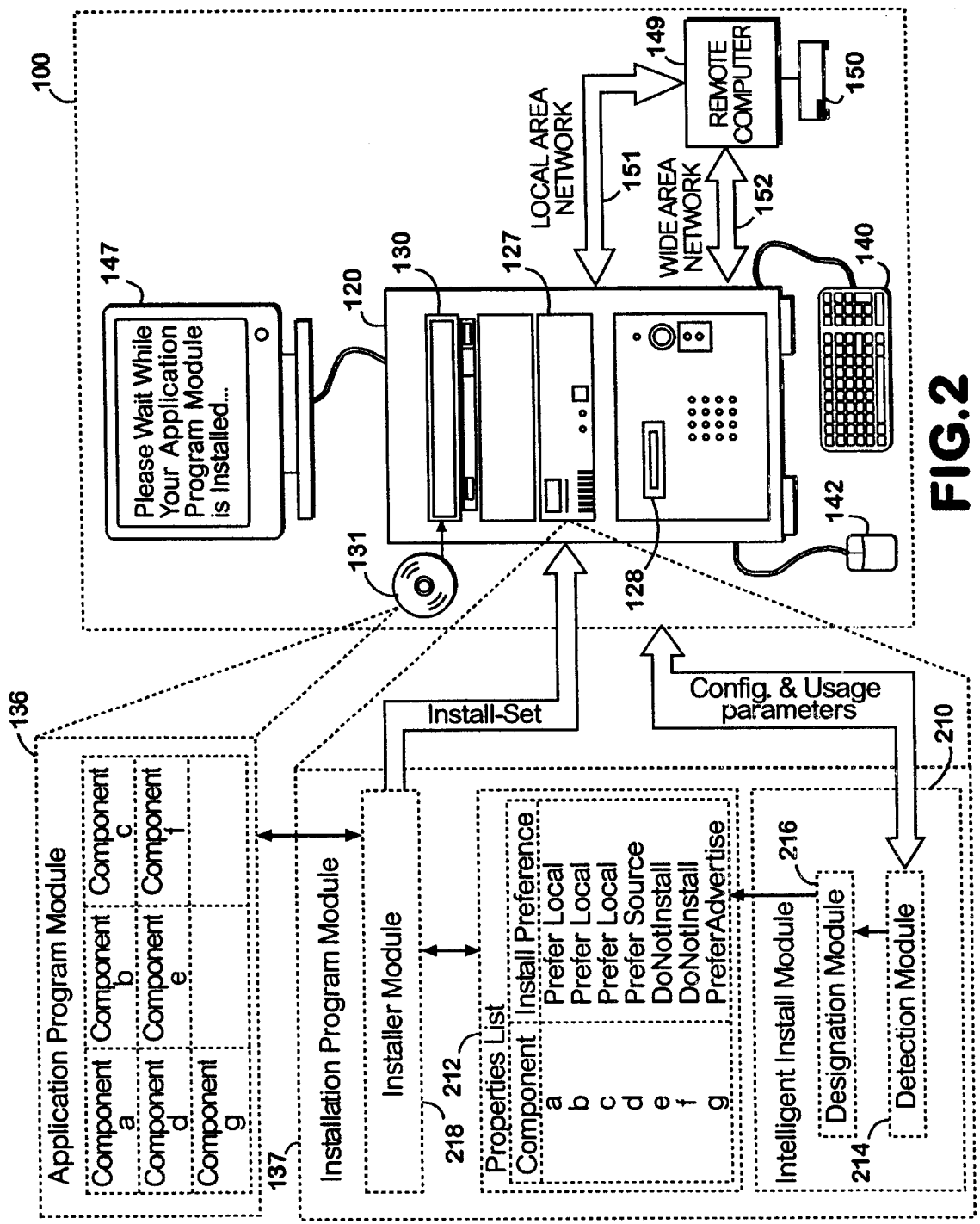
FIG. 2 is an abstract representation of the architecture of an exemplary embodiment of the present invention.

Turning now to FIG. 2, a conceptual diagram of an exemplary architecture of the present invention is shown. An installation program module 137 is provided to install an application program module 136 onto target computer system 120. The application program module 136 is generally provided via a computer-readable medium, such as a CD-ROM 131. A CD-ROM 131 is typically introduced to the target computer system 120 through an optical drive 130. The application program module may also be provided via a magnetic disk 129 (FIG. 1), a memory storage device 150 of a remote computer system 149, or any other commonly known medium. Accordingly, the application program module 136 may be introduced via a magnetic disk drive 128, or transferred from a remote computer 149 through a serial port interface 146 or a network interface 153. Other media and/or devices for introducing an application program module 136 to a target computer system 120 will be apparent to those skilled in the art and are considered to be within the spirit and scope of the present invention.

As shown, the installation program module 137 may reside on the hard disk drive 127 of the target computer system and may operate in conjunction with the operating system 135 (FIG. 1). For example, included with the WINDOWS operating system produced by Microsoft Corporation of Redmond, Washington is a WINDOWS INSTALLER program module that is operable to detect and install a new application program module 136 that is introduced to the target computer system 120. In the exemplary embodiment, an "intelligent install module" 210 is added to the existing WINDOWS INSTALLER program module to provide functionality for dynamically creating or modifying an install-set. In addition, the installation program module 137 may be provided along with the application program module 136 via a computer-readable medium, such as CD-ROM 131, or the like. Those skilled in the art will appreciate that the functionality provided by the intelligent install module 210 may be added to any type of installation program module 137.

Once the application program module 136 and/or the installation program module 137 are introduced to the target computer system 120, the processing unit 121 (FIG. 1) executes the instructions of the installation program module 137 to install the install-set of the application program module 136 onto the target computer system 120. The application program module 136 may be thought of as comprising a set of components, namely component a 136*a*, component b 136*b*, component c 136*c*, component d 136*d*, component e 136*e*, component f 136*f*, and component g 136*g*. Certain of the components 136*a–g* may be required for proper operation of the application program module 136, while other components 136*a–g* may represent optional features of the application program module 136. The installation program module 137 is operable to determine which of the components 136*a–g* are to be included in the install-set, i.e., the set of components that are to be installed onto target computer system 120. The install-set typically includes all required components and any optional components that are determined by the installation program module 137 to be appropriate for installation onto the target computer system 120.

The installation program module 137 is provided with an intelligent install module 210 for determining which of the components 136*a–g* should be included in the install-set.

Module 210 is referred to as an "intelligent install" module because it is programmed with the ability to make determinations as to the composition of an install-set. For convenience, the intelligent install module 210 is divided into two-sub modules: a detection module 214 and a designation module 216. Detection module 214 has the capability to scan the target operating environment 100 of the target 10 computer system 120 to detect certain usage and configuration parameters. Usage and configuration parameters may include any useful information concerning the configuration and prior usage of hardware and/or software. Usage and configuration parameters will be discussed in greater detail below. Detection module 214 communicates the detected usage and configuration parameters to designation module 216.

Based on the detected usage and configuration parameters, designation module 216 determines and designates which components 136a–g of the application program module are to be included in the install-set. Determinations as to which components 136a–g are to be designated for installation may be achieved through any well known decision means, such as a decision tree, a look-up table, boolean logic, etc. For example, a decision tree may be provided to evaluate the appropriate install preference of a certain component 136a–g. The "parent" node of such an exemplary decision tree might involve an examination of the BIOS 126 of computer system 120 to determine whether the computer system 120 is a laptop machine. A "child" node may involve determining whether the hard disk drive 127 contains more than a set amount of free space. A "grandchild" node may involve locating the source of the component 136a–g to be installed. Thus, decisions as to the designation of an install preference may be determined by progressing through the exemplary tree in the following manner: if the computer system 120 is a laptop machine and the hard disk drive 127 contains more than the set amount of free space, then set the preference of the component 136a–g to be "PreferLocal;" if the computer system 120 is a laptop machine and the hard disk drive 127 does not contain more than the set amount of free space, then set the preference of the component 136a–g to be "PreferAdvertise;" if the computer system 120 is not a laptop machine and the hard disk drive 127 contains more than the set amount of free space, then set the preference of the component 136a–g to be "PreferLocal;" if the computer system 120 is not a laptop machine and the hard disk drive 127 does not contain more than the set amount of free space and the source of the component is a remote computer 149, then set the preference of the component 136a–g to be "PreferSource;" if the computer system 120 is not a laptop machine and the hard disk drive 127 does not contain more than the set amount of free space and the source of the component is an optical disk 131, then set the preference of the component 136a–g to be "PreferLocal." Those skilled in the art will recognize that decision means, such as the exemplary decision tree, may be implemented in a variety of well known manners.

Designation module 216 then designates which components are to be included in or excluded from the install-set. In the exemplary embodiment, designation module 216 designates the install preference of the components by creating or modifying a properties list 212 that is maintained by the installation program module 137. The properties list 212 stores various information about the components 136a–g, including an installation preference. Those components 136a–g that are designated for installation will eventually become the install-set for the application program module 136.

Generally, various installation options are available for a component 136a–g of an application program module 136. For example, a component 136a–g may be installed locally onto the hard disk drive 127 of the target computer system. A component 136a–g may also be installed as a "source" component. A "source" component is installed in such a way that it will be run from the source installation medium, such as CD-ROM 131. Furthermore, some modem operating systems allow a component 136a–g to be installed as an "advertised" feature. An "advertised" feature is presented to the user as being an installed feature of the application program module 136, but is not actually installed until the user first attempts to access the feature. Accordingly, the installation preference of a component 136a–g may be designated as "PreferLocal," "PreferSource," "PreferAdvertise" or "DoNotinstall."

The intelligent install module 210 may be provided with varying levels of intelligence. For example, in a more simple implementation, a determination as to whether a particular component is to be installed may be based on one parameter in isolation. In such a simple implementation, the designation module 216 may be provided with a decision tree, such that the presence (or lack thereof) of one parameter triggers a decision as to the installation preference of a components 136a–g. In a more sophisticated implementation, a determination as to whether a particular component is to be installed can be the result of a complicated analysis concerning the relationships between many usage and configuration parameters. Those skilled in the art will appreciate that other modules can be added to the intelligent install module 210 to provide increased levels of intelligence.

In an exemplary embodiment, the intelligent install module may be provided with intelligence to determine an install-set based upon the existence of prior versions of the components 136a–g of the application module 136. In such an exemplary embodiment, the detection module 214 scans the target operating environment 100 to detect the presence of a prior version of the application program module 136. If a prior version of the application program module 136 is detected, the detection module 214 searches for a prior version of each component 136a–g. The absence of a prior version of a component 136a–g may be used as a signal that the user does not desire the corresponding component 136a–g to be included in the install-set.

Further, the detection module 214 may attempt to detect the usage patterns for each detected prior version of the components 136a–g. Since some previously installed components may not have been sufficiently used by the user, prior usage patterns may provide a clearer indication as to whether a component should be included in the install-set. Therefore, those components 136a–g that were either (1) not installed as part of a prior version of the application program 136, or (2) installed but not sufficiently used by the user, are considered to be undesired by the user and will be excluded from the install-set.

In the exemplary embodiment, the method used by the detection module 214 for the detection of the usage parameters depends on the nature of the installation program module that was used to install the prior versions of the components 136a–g. If a prior version of a component was installed with an installation program module similar to the WINDOW'S INSTALLER program module, detection of usage parameters may be a simple task. As part of its normal operation, the WNDOW'S INSTALLER program module records component 136a–g usage metrics. Such usage metrics can be queried by the detection module 214. However, if the installation program module used to install the prior version of the component does not record usage metrics, the detection module 214 must be equipped with the functionality to perform such a task. The detection module 214 may be programmed to detect usage metrics by comparing the date on which the prior version of a component was installed (the install date) and the date on which the prior version of the component was last accessed (the last access date). Often times, a user will install a component, access the component once or twice out of curiosity and then never access the component again. The period of time in which the user is likely to access the component only once or twice out of curiosity is referred to herein as the "trial period." Thus, if the last access date of a prior version of a component is after the expiration of a "trial period," i.e., a certain period of time after the install date, the prior component is not considered to be sufficiently used and the new version of the component 136*a–g* is excluded from the install-set. Also, if the current date falls within the "trial period," it is unknown whether the prior version of the component would have been subsequently used by the user. Thus, if the current date is within a certain period of time after the install date, the new version of the component 136*a–g* is included in the install-set.

In the exemplary embodiment, the length of the "trial period" is set at one week. If a prior version of a component was accessed more than one week after its install date or if the current date is not more than one week after the install date, the new version of the component 136*a–g* is included in the install-set. Similarly, if the last access date of the prior version of the component is not more than one week after the install date and the current date is more than one week after the install date, the new version of the component 136*a–g* is excluded from the install-set.

In an alternate embodiment, the intelligent install module 210 may be provided with intelligence to determine an install-set based upon configuration parameters. Any aspect of the target operating environment 100 of the target computer system 120 may contribute to a configuration parameter. Configuration parameters may lead to a determination of which components 136*a–g* of an application program module 136 should be installed onto the target computer system 120. For example, the number, size and free space available of any hard disk drives 127 associated with the target computer system 120 may be important to a determination of how many bytes of the application program module 136 can be stored locally on the target computer system 120. Similarly, the number and speed of optical drives 130 or magnetic drives 128 may also be important to a determination of which components 136*a–g* of the application program module 136 should be installed as "source" components or "advertised" components.

Other configuration parameters may include the amount of RAM 125 and the sophistication and speed of the processing unit 121, which may be relevant to a determination of the components 136*a–g* that should be installed onto the target computer system 120 to maximize the operating efficiency of the application program module 136. The existence of a network interface 153 or a modem 154 may lead to a determination that fewer components 136*a–g* should be included in the install-set due to the fact that the uninstalled components can be quickly and easily retrieved from a remote computer 149. In addition, the existence or lack of certain peripheral devices, such as a mouse 142, joystick (not shown), printer (not shown), etc. may lead to a determination that certain components 136*a–g* are required or are not required to drive the peripheral devices. Other configuration parameters will be apparent to those having ordinary skill in the art. In referring to configuration parameters, the scope of the present invention is intended to encompass any aspect of the target operating environment that may lead to a determination of the composition of an install-set.

After the install preferences of the components 136*a–g* have been designated by designation module 216, an installer module 218 is called to physically install the install-set onto the target computer system 120. The installer module 218 reads the installation preferences in the properties list 212 to determine which of the components 136*a–g* are to be included in the install-set. Installer module 218 then installs the components of the install-set onto the target computer system 120 according to any well known method. Installer modules, such as the WINDOW'S INSTALLER program module, are commonly known in the art and thus, a description of the operation of the install module 218 will be omitted.

Those having ordinary skill in the art will appreciate that the functionality of the exemplary installation program module 137 is divided between modules and sub-modules so as to simplify programming tasks. However, the modular architecture of the exemplary installation program module 137 is provided solely as an example and should not be considered to be a limitation of the scope of the present invention. The functionality of one described module may be incorporated into another describe module, or an entirely new module. It will be appreciated that the functionality of the installation program module may be implemented through various programming methods commonly known in the art.

Figure 3:
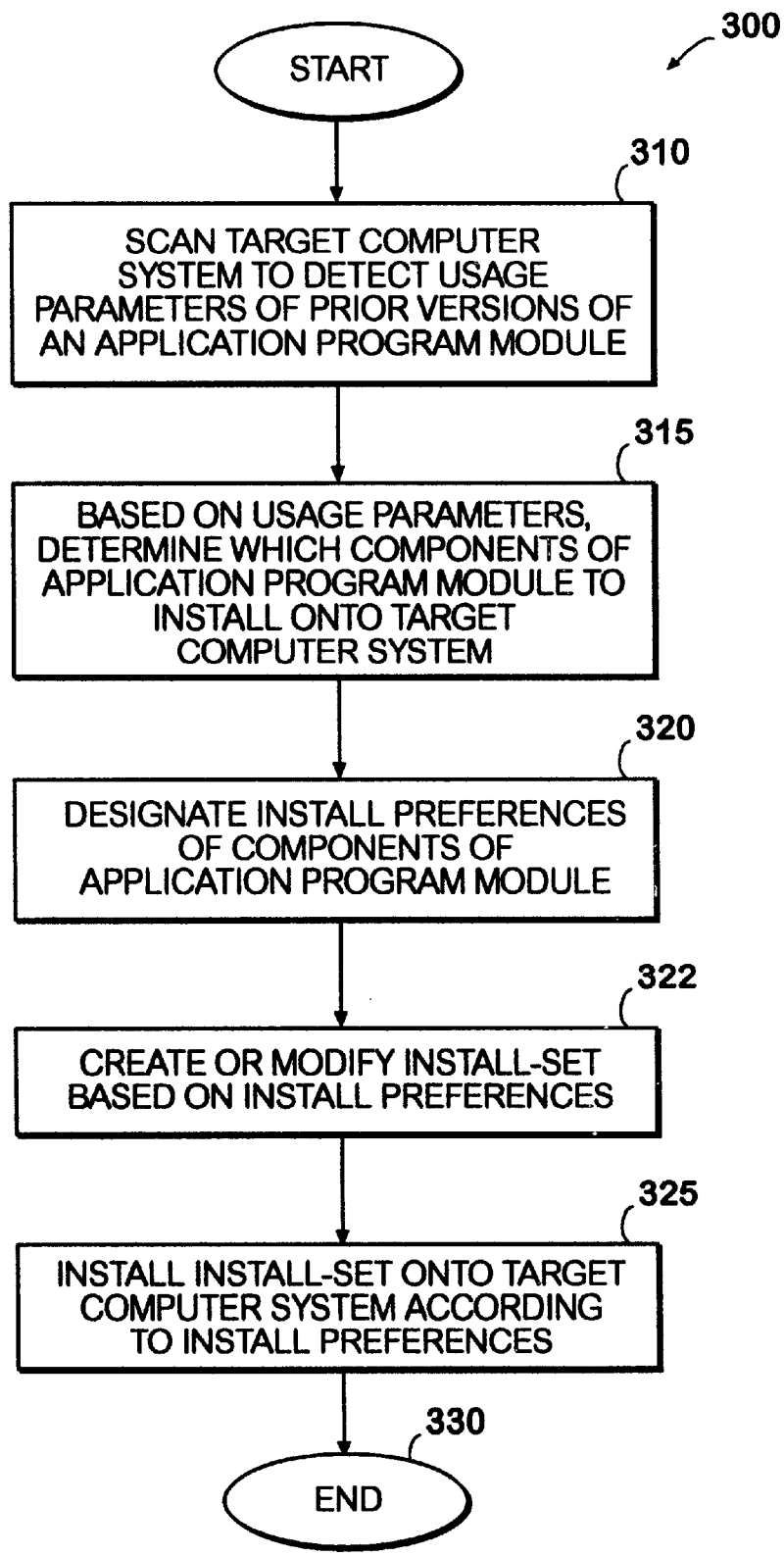
FIG. 3 is a flow chart that illustrates the general operation of an exemplary embodiment of the present invention.

FIG. 3 is a flowchart setting forth the general steps involved in an exemplary embodiment of the present invention. The exemplary method 300, determines an install-set based on the usage parameters of prior versions of the components 136*a–g* of an application program module 136. Exemplary method 300 begins at step 310, where the target computer system 120 is scanned to detect usage parameters. Next, the method proceeds to step 315 where determinations are made, based on the usage parameters, as to which components 136*a–g* are to be installed onto the target computer system 120. For those components 136*a–g* that are to be installed, the determinations made in step 315 may also involve the manner in which components 136*a–g* are to be installed, i.e., locally, from the source medium or as advertised features. At step 320, the install preferences of each component 136*a–g* are designated based on the determinations made in step 315. Install preferences may be "DoNotInstall," "PreferLocal," "PreferSource" or "PreferAdvertise." At step 322, an install-set is created or modified based on the install preferences designated for each component 136*a–g*. Components 136*a–g* having an install preference of "DoNotInstall" are excluded from the install-set, while all other components are included in the install- set. The install-set includes information relating to the install preferences of the components 136*a–g* that are included therein. Finally, at step 325, the components 136*a–g* are installed onto the target computer system 120 according to their respective install preferences. The exemplary method terminates at step 330.

Figure 4:
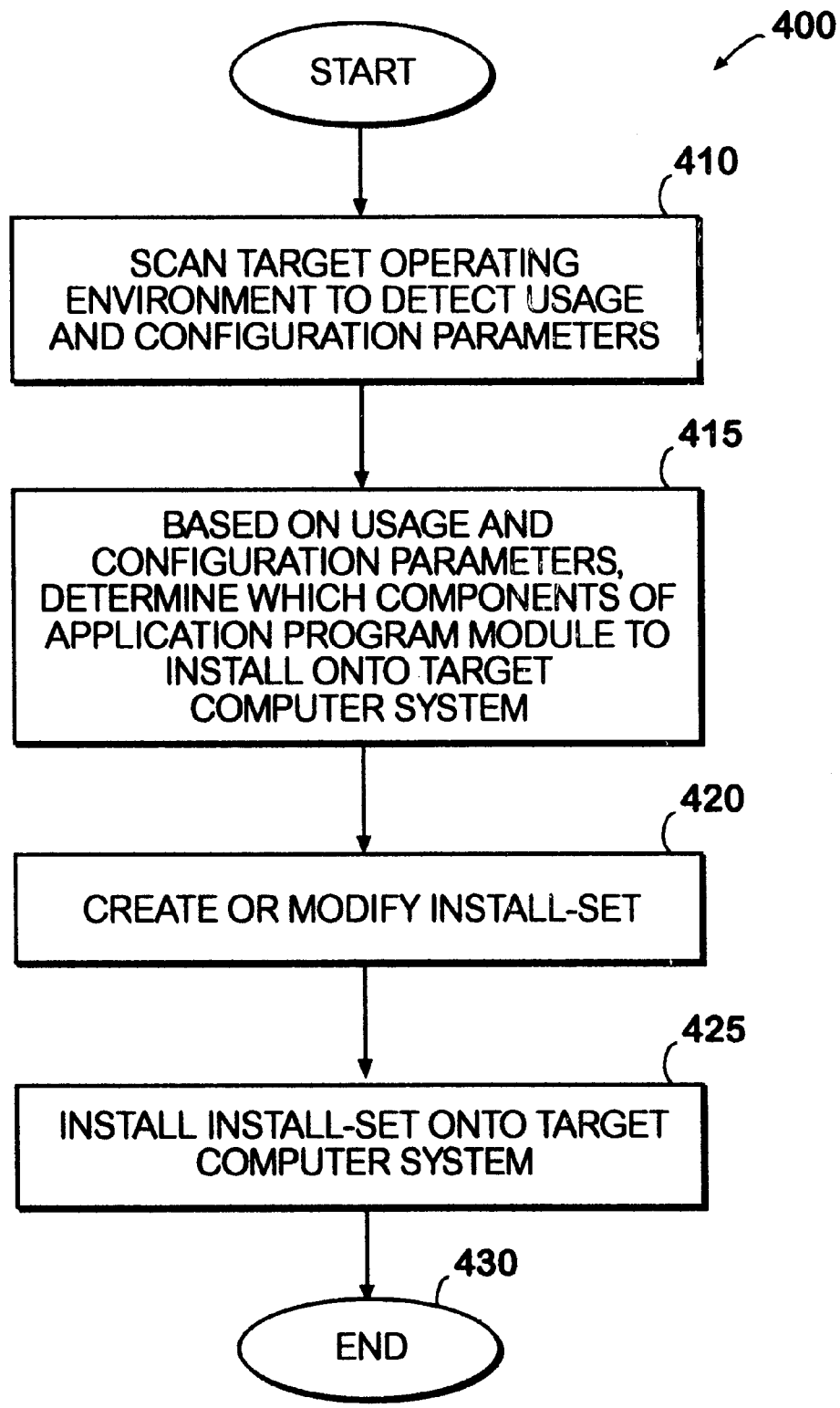
FIG. 4 is a flow chart that illustrates the general operation of an alternate embodiment of the present invention.

FIG. 4 is a flow chart showing the steps involved in an alternate embodiment of the present invention. Method 400 determines an install-set based on both usage and configuration parameters. Method 400 begins at step 410, where the target operating environment 100 of the target computer system 120 is scanned to detect usage parameters and configuration parameters. As mentioned above, usage parameters relate to the existence and prior usage of prior versions of the components 136a–g of an application program module 136. Also as mentioned, a configuration parameter may involve any configuration aspect of the target operating environment 100, including hardware and software configuration. Next, the method proceeds to step 415, where determinations are made, based on the usage and configuration parameters, as to which components 136a–g are to be installed onto the target computer system 120. Then, at step 420 the install-set is created or modified based on the determinations made in step 415. At step 425, the install-set is physically installed onto the target computer system 120 and at step 430 the method is terminated.

In view of the foregoing, it will be appreciated that the present invention provides a method and system for dynamically creating or modifying an install-set for an application program module. Still, it should be understood that the foregoing relates only to the exemplary embodiments of the present invention, and that numerous changes may be made thereto without departing from the spirit and scope of the invention as defined by the following claims.

We claim:

1. A method for dynamically creating or modifying an install-set for a program module comprising a plurality of components, the method comprising the computer-implemented steps of:

detecting a parameter in a target operating environment of a target computer system;

based on the parameter, programmatically determining which of the plurality of components of the program module are to be installed onto the target computer system; and in response to determining which of the components are to be installed, including the components to be installed in the install-set, whereby the install-set comprises at least one of the components of the program module for installation onto the target computer system.

2. The method of claim 1, wherein the parameter relates to prior usage of a prior version of the program module.

3. The method of claim 2, wherein the detecting step comprises:

scanning the target operating environment for a prior version of the component; and locating the prior version of the component in the target operating environment, whereby the parameter identifies the existence of the prior version of the component.

4. The method of claim 2, further comprising the steps of:

determining a current date;

determining an install date for the prior version of the component; and determining that the current date is not more than a period of time after the install date, whereby the parameter identifies the potential use of the prior version of the component.

5. The method of claim 4, wherein the period of time is one week.

6. The method of claim 2, further comprising the steps of:

determining an install date for the prior version of the component;

determining a last-access date for the prior version of the component;

determining that the last-access date is more than a period of time after the install date, whereby the parameter identifies the use of the prior version of the component.

7. The method of claim 6, wherein the period of time is one week.

8. The method of claim 1, wherein the including step comprises designating an installation preference of the component to indicate that the component is to be included in the install-set.

9. The method of claim 8, wherein the installation preference is selected from the group consisting of: PreferLocal, PreferSource and PreferAdvertise.

10. The method of claim 1, wherein the parameter relates to the configuration of the target operating environment.

11. The method of claim 10, wherein the target computer system comprises a hard disk drive having available free space; and wherein the detection step comprises scanning the target operating environment to determine the available free space in the hard disk drive of the target computer system.

12. The method of claim 10, wherein the detection step comprises scanning the target operating environment for the existence of a peripheral device connected to the target computer system.

13. The method of claim 10, wherein the detection step comprises scanning the target operating environment for the existence of a network connection for the target computer system.

14. A computer readable medium having stored thereon computer-implemented instructions for dynamically modifying an install-set for a program module comprising a plurality of components, the install-set comprising components of the program module designated to be installed onto the target computer system, the computer-implemented steps comprising:

detecting a parameter in a target operating environment of the target computer system;

based on the parameter, programmatically determining which of the plurality of components of the program module are not to be installed onto the target computer system; and in response to determining that components are not to be installed, excluding the components to be excluded from the install-set.

15. The computer readable medium of claim 14, wherein the parameter relates to prior usage of a prior version of the program module.

16. The computer readable medium of claim 15, wherein the detecting step comprises:

scanning the target operating environment for a prior version of the component; and not locating the prior version of the component in the target operating environment, whereby the parameter identifies the non-existence of the prior version of the component.

17. The computer readable medium of claim 15, further comprising the steps of:

scanning the target operating environment for a prior version of the component;

locating a prior version of the component in the target operating environment;

determining a current date;

determining an install date for the prior version of the component;

determining a last-access date for the prior version of the component;

determining that the last-access date is not more than a period of time after the install date; and determining that the current date is more than the period of time after the install date, whereby the parameter identifies the non-use of the prior version of the component.

18. The computer readable medium of claim 17, wherein the period of time is one week.

19. The computer readable medium of claim 14, wherein the excluding step comprises designating an installation preference of the component to indicate that the component is to be excluded from the install-set.

20. The computer readable medium of claim 14, herein the parameter relates to the configuration of the target operating environment.

21. The computer readable medium of claim 20, wherein the target computer system comprises a hard disk drive having available free space; and wherein the detection step comprises scanning the target operating environment to determine the available free space in the hard disk drive of the target computer system.

22. The computer readable medium of claim 20, wherein the detection step comprises scanning the target operating environment for the existence of any peripheral devices attached to the target computer system.

23. The computer readable medium of claim 20, wherein the detection step comprises scanning the target operating environment to for the existence of a network connection for the target computer system.

24. A system for dynamically modifying an install-set for a program module, the program module comprising a plurality of components, the install-set comprising one or more components of the program module designated to be installed onto the target computer system, the system comprising:

a memory for storing the program module; and a processing unit, coupled to the memory, for processing computer-executable instructions for:

detecting a parameter in a target operating environment of the target computer system, based on the parameter, programmatically determining which of the plurality of components of the program module are to be installed onto the target computer system, in response to determining whether components are to be installed, designating an install preference for each of the components to be installed, and installing each of the components to be installed according to their install preference.

25. The system of claim 24, wherein the parameter relates to the usage of a prior version of the first component; and wherein the instructions for detecting the parameter in the target operating environment comprise instructions for scanning the target operating environment to locate the prior version of the first component.

26. The system of claim 25, wherein the instructions for determining whether the first component is to be installed comprise instructions for:

determining a current date;

determining an install date for the prior version of the first component;

determining whether the current date is more than a period of time after the install date; and if the current date is not more than the period of time after the install date, determining that the first component is to be included in the install-set.

27. The system of claim 25, wherein the instructions for determining whether the first component is to be installed comprise instructions for:

determining an install date for the prior version of the first component;

determining a last access date for the prior version of the first component;

determining whether the last access date is more than a period of time after the install date; and if the last access date is more than the period of time after the install date, determining that the first component is to be included in the install-set.

28. The system of claim 25, wherein the instructions for determining whether the first component is to be installed comprise: determining a current date; determining an install date for the prior version of the first component; determining a last-access date for the prior version of the first component;

determining whether the last-access date is more than a period of time after the install date;

determining whether the current date is more than the period of time after the install date; and if the last-access date is not more than the period of time after the install date and the current date is more than the period of time after the install date, determining that the first component is to be excluded from the installset.

29. The system of claim 24, wherein the parameter relates to the configuration of the target operating environment.

30. The system of claim 29, wherein target computer system comprises a hard disk drive having available free space; and wherein the instructions for detecting the parameter in the target operating environment comprise instructions for scanning the target operating environment to determine the available free space in the hard disk drive of the target computer system.

31. The system of claim 29, wherein the instructions for detecting the parameter in the target operating environment comprise instructions for scanning the target operating environment for the existence of a peripheral device attached to the target computer system.

32. The system of claim 29, wherein the instructions for detecting the parameter in the target operating environment comprise instructions for scanning the target operating environment for the existence of a network connection for the target computer system.

* * * * *

UNITED STATES PATENT AND TRADEMARK OFFICE
CERTIFICATE OF CORRECTION

PATENT NO. : 6,378,128 B1
DATED : April 23, 2002
INVENTOR(S) : Edelstein et al.

It is certified that error appears in the above-identified patent and that said Letters Patent is hereby corrected as shown below:

Column 13,
Line 11, "herein" should read -- wherein --
Line 27, delete the word "to"

Signed and Sealed this

Twenty-second Day of July, 2003

JAMES E. ROGAN
*Director of the United States Patent and Trademark Office*